United States Patent [19]
Peacock

[11] Patent Number: 5,833,206
[45] Date of Patent: Nov. 10, 1998

[54] UNIVERSAL FOOT FOR TELECOMMUNICATIONS SWITCHING CABINET

[75] Inventor: John Leonard Peacock, Fremont, Calif.

[73] Assignee: Ericsson, Inc., Research Triangle Park, N.C.

[21] Appl. No.: 811,590

[22] Filed: Mar. 5, 1997

[51] Int. Cl.[6] .................................................. F16M 11/26
[52] U.S. Cl. ....................................... 248/677; 248/188.5
[58] Field of Search .............................. 248/677, 346.06, 248/188.8, 500, 501, 502, 911, 912, 680, 688, 188.4, 903, 188.5, 650, 299.1, 678, 676, 637; 109/56; 312/245

[56] References Cited

U.S. PATENT DOCUMENTS

| | | | |
|---|---|---|---|
| 1,600,835 | 9/1926 | Manley | 248/188.5 |
| 3,448,949 | 6/1969 | Kelley. | |
| 3,964,705 | 6/1976 | Giovanni | 248/500 X |
| 4,222,559 | 9/1980 | Hammer | 248/188.5 X |
| 4,690,365 | 9/1987 | Miller et al. | 248/650 |
| 4,776,553 | 10/1988 | Kobayashi | 248/912 X |
| 5,116,004 | 5/1992 | Luecke | 248/188.5 X |
| 5,596,934 | 1/1997 | Hamm et al. | 248/500 X |

FOREIGN PATENT DOCUMENTS

| | | |
|---|---|---|
| 2 522 238 | 8/1982 | Germany. |
| 2 638 793 | 11/1988 | Germany. |
| 4234836A1 | 1/1994 | Germany. |
| 94 18 216 U | 3/1995 | United Kingdom. |

*Primary Examiner*—Ramon O. Ramirez
*Assistant Examiner*—Long Dinh Phan
*Attorney, Agent, or Firm*—Rhodes, Coates & Bennett, L.L.P.

[57] ABSTRACT

A support foot for a telecommunications switching cabinet companies a generally planar base member and a support member extending upward from the base member to support the cabinet. The base member includes a plurality of arcuate slots to receive anchor bolts which secure the support foot to the floor. The anchor bolts can be located anywhere within the arcuate slots so that embedded rebar in the floor can be easily avoided.

13 Claims, 3 Drawing Sheets

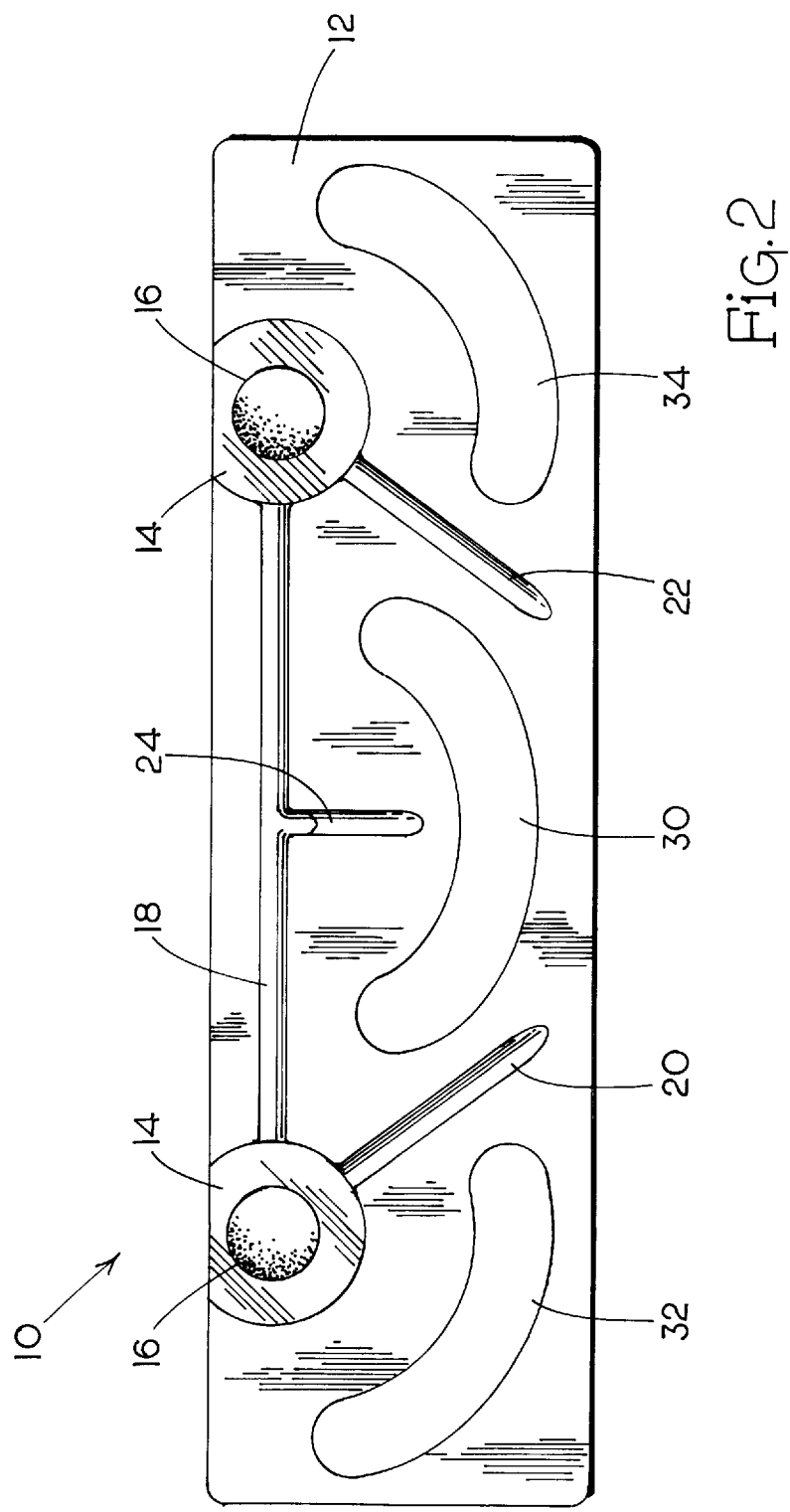

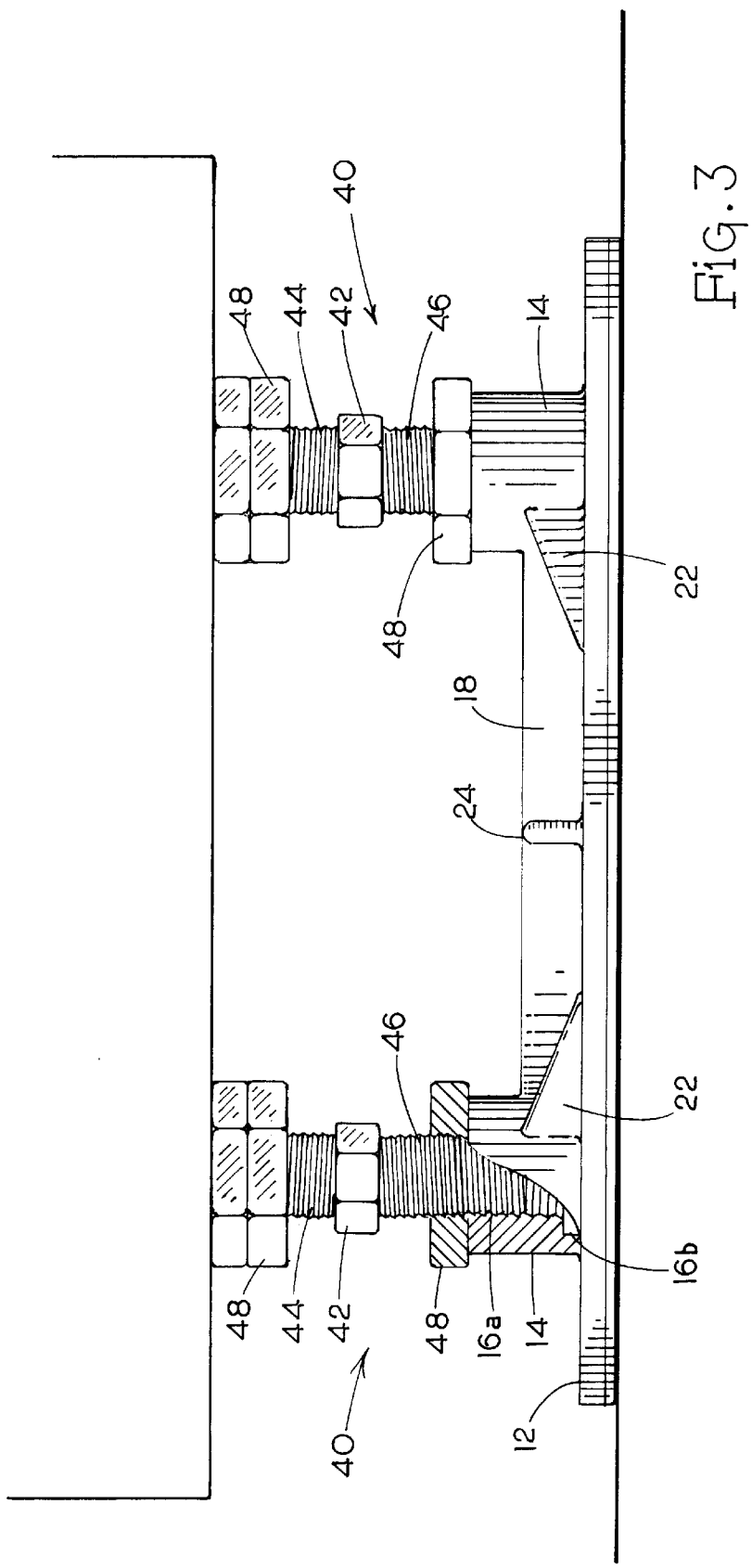

UNIVERSAL FOOT FOR TELECOMMUNICATIONS SWITCHING CABINET

FIELD OF THE INVENTION

The present invention relates generally to cabinets for telecommunications switching equipment, and more particularly, to a support foot for a telecommunications switching cabinet.

BACKGROUND OF THE INVENTION

In a typical telecommunications switching center, the switching equipment is mounted in large cabinets anchored to the floor which is typically concrete. The cabinet is supported on a plurality of individual support feet which are spaced along the front and rear edges of the cabinet. The support feet are anchored by drilling a hole in the concrete floor and placing expansion anchors through the foot into the hole in the concrete floor. After anchoring the support feet, the cabinet is lowered onto the support feet and secured by screws.

The support feet used in the past to anchor a telecommunications switching cabinet have a number of drawbacks. One significant problem is rebar interference. In a typical telecommunications switching center, there is a significant amount of rebar embedded within the concrete floor which runs in many different directions. If rebar is encountered when drilling a hole in the concrete, the installer will typically do one of two things. The installer may attempt to relocate the support foot which means that the other support feet which are already anchored will also have to be moved to maintain the proper spacing between the support feet. Alternatively, the installer may simply cut the rebar in the concrete floor which compromises the structural integrity of the floor.

Another problem is the difficulty in maintaining proper spacing between the support feet. A typical telecommunications switching cabinet has a series of mounting nuts which are welded to the bottom of the cabinet a fixed distance apart. If the support feet are not properly spaced (i.e. either slightly too far apart or slightly too close together), the cabinet cannot be installed onto the support feet. In the past, this problem was solved by filling in the existing hole in the concrete with a special epoxy concrete filler and drilling a new hole next to it. This practice is not generally recommended when using expansion anchors since the concrete surrounding the new hole has been compromised.

Another drawback with prior art support feet is that the individual feet do not provide a stable platform unless they are anchored to the floor. Thus, it is common practice to remove the support feet when the cabinet is being transported.

Finally, the support feet used in the past were not suitable for use in seismically active regions. In regions where seismic activity is likely to occur, a separate center bar is used. This practice further complicates the installation of the telecommunications switching cabinet. It is usually a better engineering practice that supporting devices used in seismically active regions be one-piece construction and not multiple pieces.

SUMMARY OF THE INVENTION

The present invention provides a support foot for a telecommunications switching cabinet which solves some of the aforementioned problems with the prior art. The support foot comprises an elongated base member with two integrally-formed support columns. The base member includes three arcuate slots through which anchor bolts pass to secure the foot to a concrete slab. The arcuate slots in the base member allow anchor bolts to be moved if necessary to avoid any rebar in the slab.

The telecommunications switching cabinet is secured to the support columns by coupling elements. In a preferred embodiment of the invention, the coupling elements are differential screws. One end of the differential screw threads into an internally threaded hole in the support column while the opposite end threads into a mounting nut secured to the bottom of the cabinet. By using a differential screw in this manner, it is possible to level the cabinet by turning the differential screws.

The support foot of the present invention solves the problems associated with the prior art. First, since the anchor bolts can be located anywhere within the arcuate slots, it is easier to locate the support foot so as to avoid rebar in the floor. This allows for more flexibility in the placement of the switching cabinets. Second, since the front and rear support columns are part of a unitary construction, the center-to-center distance of the support columns will always match the center-to-center distance on the mounting nuts on the cabinet. This avoids problems with misalignment which was frequently encountered in prior art designs. Third, the unitary construction provides a stable platform for the cabinet during shipping and handling. Therefore, it is not necessary to remove the support feet for transportation. Finally, the unitary construction of the support foot is better suited for seismically active regions and eliminates the need for a separate center bar as is common in prior art designs.

Other objects and advantages of the present invention will become apparent and obvious from a study of the following description and the accompanying drawings which are merely illustrative of such invention.

BRIEF DESCRIPTION OF THE DRAWINGS

FIG. 2 is a top plan view of the support foot.

FIG. 3 is an elevation view of the support foot with a portion of the support column cut away.

DETAILED DESCRIPTION OF THE INVENTION

Figure 1:
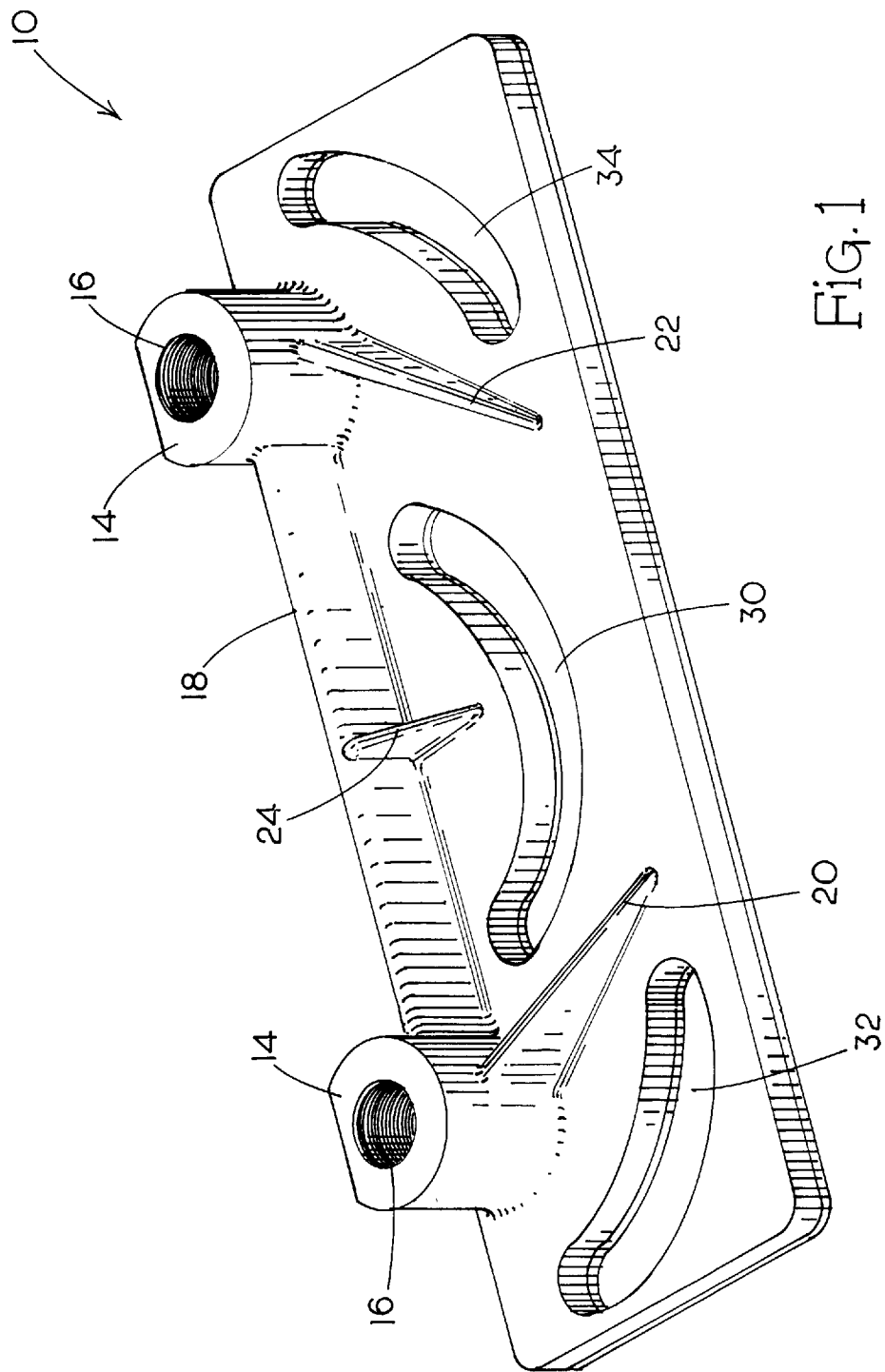
FIG. 1 is a perspective view of the support foot of the present invention.

Referring now to the drawings, the support foot of the present invention is shown therein and indicated generally by the numeral 10. The main components of the support foot 10 include a generally flat base member 12 and a pair of spaced apart support columns 14 which are integrally formed with one another.

As shown in FIG. 2, the support columns 14 are formed along one side of the base member 12. The support columns 14 have generally cylindrical configuration. The side of the support columns 14 which faces the outer edge of the cabinet when the support foot is installed is flattened. The flattened side prevents the support foot from projecting beyond the envelope of the cabinet so that a skirt can be installed around the cabinet.

An opening 16 is formed in each support column 14 to receive a coupling member 40 as will be hereinafter described. The opening 16 extends from the top of each support column 14 through the base member 12. The upper portion 16a of opening 16 is internally threaded to receive the coupling member 40. The lower portion 16b of the opening 16 has a larger diameter than the upper portion 16a and has a smooth wall.

A reinforcing member 18 extends between the two support columns 14 and is approximately one-half of the height of the support column 14. Triangular shaped braces 20 and 22 extend at an angle from respective support columns 14. A third triangular brace 24 extends perpendicularly from the center of the reinforcing member 18. The reinforcing member 18 and triangle braces 20, 22, and 24 provide additional strength and rigidity to the support columns 14 to prevent excessive flexing during earthquakes in earthquake-prone regions.

The base member 12 includes a series of accurate slots 30, 32 and 34 which extend through the base member 12. The purpose of the accurate slots 30, 32, and 34 is to receive anchor bolts which secure the support foot 10 to the floor. The shape of the accurate slots 30, 32 and 34 allows for the re-location of the anchor bolts in the event that rebar is encountered in the floor. If rebar is encountered during installation the anchor bolt can be repositioned within the accurate slot 30, 32 or 34 to avoid the rebar.

A shim 36 made of a suitable dielectric material is applied to the bottom of the base member 12 to electrically isolate the support foot 10 from the floor. The shim 36 conforms to the shape of the base member 12. The accurate slots 30, 32 and 34 which extend through the base member 12 also extend through the shim 36.

The support foot 10 is cast from a material which is structurally sound while being flexible, such as 17-4 stainless steel. This material also has excellent corrosion-resistant characteristics. The arcuate slots 30, 32 and 34 are formed during casting. The support columns 14 are solid when casted and are subsequently drilled and tapped. The shim 36 is secured to the base member 14 after casting and machining by a suitable adhesive.

In use, the support foot 10 is secured to the floor by anchor bolts (not shown). The support foot 10 is placed in the desired location and holes are drilled in the concrete floor with the support foot 10 in place. The expansion anchors are then inserted into the holes in the floor. The expansion anchors are internally threaded to receive the anchor bolts. The anchor bolts extend through the arcuate slots 30, 32 and 34 and screw into the expansion anchors in the floor.

Once the support foot is firmly secured to the floor, the telecommunications switching cabinet is lowered onto the support foot and secured by a coupling member 40. The coupling member 40 could be a simple hex bolt which extends through the floor of the cabinet and screws into the threaded holes of the support column. In the preferred embodiment, however, the coupling member 40 is a differential screw 42 having opposing threads at opposite ends 44, 46 thereof. One end 44 of the screw threads into a mounting nut on the cabinet and the opposite end 46 threads into the support column 14 of the support foot 10. When the differential screw 42 is turned in a first direction, the cabinet is pulled closer to the support foot. When turned in the opposite direction, the cabinet is raised. The advantage of using a differential screw 42 as a coupling member 40 is that it provides a simple mechanism for leveling the cabinet. Once the correct height is obtained, locking nuts 48 are tightened against either the mounting nut on the cabinet or the support foot 10 to secure the differential screw 42 in the adjusted position.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A support foot for supporting a telecommunications cabinet comprising:

(a) a generally flat base member;

(b) a series of spaced-apart arcuate shaped slots formed in the base member for receiving anchor members that secure the support foot to an underlying support surface;

(c) at least two spaced-apart support columns disposed adjacent the arcuate shaped slots and integrally formed with the base member and extending generally upwardly therefrom;

(d) each support column including an internal threaded bore having a vertical axis that extends generally perpendicular to the plane of the base member; and (e) a plurality of coupling members secured to the columns and extending upwardly therefrom for supporting the telecommunications cabinet, each coupling member including a lower externally threaded portion that is adapted to be received and supported within the threaded bore of a respective support column and an upper portion adapted to extend upwardly from the respective support column for supporting the telecommunication cabinet above the support foot.

2. The support foot of claim 1 including an elongated stiffening member extending between and interconnecting the two spaced apart columns, and wherein the base member, the two support columns, and the stiffening member are integrally formed.

3. The support foot of claim 2 including a pair of braces that are integrally formed with the support columns and which project outwardly therefrom.

4. The support foot of claim 3 wherein the two support columns are disposed adjacent one edge of the base member and wherein the interconnecting stiffening member extends generally parallel to said edge, and wherein the pair of braces projecting from the support columns are directed towards an opposite edge of the base member.

5. The support foot of claim 3 wherein the stiffening member and the two braces are vertically oriented and project upwardly out of the plane of the base member.

6. The support foot of claim 1 wherein each support column assumes a generally cylindrical shape.

7. A support foot for supporting a telecommunications cabinet comprising:

(a) a generally flat base member;

(b) a series of spaced-apart arcuate shaped slots formed in the base member for receiving anchor members that secure the support foot to an underlying support surface;

(c) at least two spaced-apart support columns disposed adjacent the arcuate shaped slots and integrally formed with the base member and extending generally upwardly therefrom;

(d) each support column including an internal threaded bore having a vertical axis that extends generally perpendicular to the plane of the base member;

(e) a stiffening member formed on the support foot and extending between and interconnecting the two support columns; and (f) a plurality of coupling members secured to the columns and extending upwardly therefrom for supporting the telecommunications cabinet, each coupling member including a lower externally threaded portion that is adapted to be received and supported within the threaded bore of a respective support column and an upper portion adapted to extend upwardly from the respective support column for supporting the telecommunication cabinet above the support foot.

8. The support foot of claim 7 including a dielectric shim secured to a bottom portion of the base member.

9. The support foot of claim 8 including a series of vertically oriented braces that extend from the support columns and which are integral with the base member.

10. The support foot of claim 7 wherein the support columns are substantially cylindrical in configuration.

11. The support foot of claim 10 wherein each support column includes a flattened exterior surface.

12. The support foot of claim 7 wherein the foot structure is formed of a cast material.

13. The support foot of claim 7 wherein each coupling member includes two sets of opposing threads disposed at opposite end portions of the coupling member such that each coupling member functions on a differential screw.

* * * * *